United States Patent
Roberts et al.

(10) Patent No.: US 6,740,237 B1
(45) Date of Patent: May 25, 2004

(54) LOW PROFILE EXTRUDED UNDERDRAIN

(75) Inventors: R. Lee Roberts, Chadds Ford, PA (US); Mark Kevin Addison, Bear, DE (US); Andrew Scott Taylor, Drexel Hill, PA (US)

(73) Assignee: RG Delaware, Inc., Wilmington, DE (US)

( * ) Notice: Subject to any disclaimer, the term of this patent is extended or adjusted under 35 U.S.C. 154(b) by 0 days.

(21) Appl. No.: 08/935,365

(22) Filed: Sep. 22, 1997

(51) Int. Cl.$^7$ ................................................ B01D 35/30
(52) U.S. Cl. ........................ 210/275; 210/274; 210/293
(58) Field of Search ................................. 210/275, 283, 210/291, 292, 293, 279, 791–793, 797–798, 274; 52/731.1, 731.2, 737.1, 737.4

(56) References Cited

U.S. PATENT DOCUMENTS

| | | | |
|---|---|---|---|
| 3,110,667 A | 11/1963 | Stuppy | 210/275 |
| 3,685,657 A | 8/1972 | Hunter | |
| 3,956,134 A | 5/1976 | Sturgill | 210/275 |
| 4,579,659 A | * 4/1986 | Eades et al. | 210/541 |
| 4,619,765 A | * 10/1986 | Roberts | 210/289 |
| 5,068,034 A | 11/1991 | Walter | |
| 5,087,362 A | 2/1992 | Brown | 210/293 |
| 5,108,627 A | * 4/1992 | Berkebile et al. | 210/793 |
| 5,149,427 A | 9/1992 | Brown et al. | 210/274 |
| 5,160,614 A | 11/1992 | Brown | 210/275 |
| 5,269,920 A | * 12/1993 | Brown et al. | 210/274 |
| 5,328,608 A | 7/1994 | Bergmann et al. | 210/274 |
| 5,462,664 A | 10/1995 | Neuspiel | 210/274 |
| 5,489,388 A | * 2/1996 | Brown et al. | 210/794 |
| 5,618,426 A | 4/1997 | Eischen et al. | 210/541 |
| 5,639,384 A | 6/1997 | Brown et al. | 210/794 |
| 5,678,381 A | * 10/1997 | DenAdel | 52/730.1 |
| 5,865,999 A | 2/1999 | Shea et al. | 210/289 |

FOREIGN PATENT DOCUMENTS

WO    WO 97/00110    1/1997

OTHER PUBLICATIONS

"Leopold Universal Type S™ Underdrain. The Proven Standard of Excellence Made Better", Leopold Water & Wastewater Products, 1994, 4 pages.

* cited by examiner

*Primary Examiner*—Joseph Drodge
(74) *Attorney, Agent, or Firm*—Merek, Blackmon & Voorhees, LLC (57) ABSTRACT

An improved underdrain block for an underdrain system supporting a filter media bed in a liquid filtration system is provided. The underdrain blocks are preferably made of an extrudable polymeric material that is extruded in relatively long sections to provide light weight, strong, easily manufactured underdrain systems having a lower profile than prior art underdrain blocks. The underdrain block comprises an upper wall, side walls, a lower wall, at least one lateral member between the upper wall and the lower wall, at least two chambers within the underdrain block, each chamber being defined by the lateral member, a plurality of upper orifices in the upper wall of the underdrain block, and a plurality of internal orifices in the lateral member. The underdrain block is substantially greater in longitudinal length than a longitudinal distance between the upper orifices. In one embodiment, the underdrain block has rails situated on the upper wall for engaging extruded members, which in turn, have receiving recesses for receiving a layer of porous filter media. In another embodiment, the underdrain block further comprises an air nozzle for achieving an improved distribution of air through a filter bed during air backwashing.

5 Claims, 8 Drawing Sheets

LOW PROFILE EXTRUDED UNDERDRAIN

The present invention relates to filters, and more particularly to underdrains for liquid filtration systems, particularly water and waste water filtration systems.

BACKGROUND OF THE INVENTION

Filters and the like that use a filter media bed to remove solids from liquids are well known. Such systems typically include a liquid distribution system that collects liquid after it is filtered in one flow direction and distributes clean liquid through the filter media in a reverse flow direction to effect a cleaning process known as backwashing.

Water filtration systems of the gravity type are commonly employed for filtering high volumetric flow rates of liquids, e.g., in municipal and industrial water treatment and waste water treatment plants. Filtration systems generally comprise one or more filters, each employing a bed of granular filter media for filtering a liquid as it seeps downward through the filter bed.

Each filtration system generally comprises an open filter basin having a floor and vertical walls surrounding the floor and an underdrain positioned over the floor. The underdrain defines a perforated false bottom in the basin for supporting the filter media bed and to provide a system of fluid passageways for both removing the filtered water from the bottom of the filter basin and directing water and/or air into the filter bed during backwashing.

The filter media bed is generally several feet deep and is typically comprised of successive layers of gravel, sand, anthracite, or other granular filter media. Traditional filter designs use support media such as multiple gravel layers, beginning with relatively coarse sizes next to the underdrain's top surface and gradating up to relatively fine sizes, are placed on the top surface of the underdrain to prevent the finer filter media from entering the underdrain and contaminating the filtered water.

Other filter designs are considered "gravel-less" and use various types and configurations of porous media to prevent the granular filter media from entering the underdrain. The filter media for both traditional and gravel-less designs consist of one or more layers of sand, anthracite, or other filter media, gradated from coarse on top to fine on bottom, and placed upon the support gravel or porous media.

During operation of the filtration system, the influent, i.e., unfiltered water, is directed into the filter basin to a depth of several feet above the upper layer of filter media. The influent is allowed to flow downward though the filter media bed. During this process, the suspended materials in the unfiltered water become trapped in the filter media. The water ultimately reaches the bottom of the filter bed and passes through the perforations in the underdrain system. The water is then collected in a system of fluid passageways within the underdrain system and is carried out of the filter basin through a suitable conduit or flume.

After the filtration system is operational for an extent of time, the efficiency of the system decreases and it becomes necessary to wash the filter media bed to remove material trapped therein. Washing of the filter media is accomplished by utilizing a backwashing process. The backwashing process involves pumping pressurized water and/or air in a reverse direction into the system of fluid passageways in the underdrain system upward through the perforations in the underdrain, and into the overlying filter media bed. The wash water flowing upwardly through the filter media bed carries the trapped materials upward from the filter bed. The wash water and the materials entrained or suspended therein are then collected at the top of the filter basin and carried away.

During the backwashing operation it is desirable to obtain a uniform distribution of wash water throughout the filter media bed to effect complete washing of the entire filter bed. If the wash water distribution is uneven so that dead spots occur at certain locations within the filter bed, then those portions of the filter bed will be improperly cleansed, thereby reducing the efficiency of the filter.

The backwashing process must also be performed under carefully controlled conditions so as to avoid unduly disturbing or damaging the filter media bed. For example, the velocity of the wash water must be controlled at a level below that which would cause the filter media to become entrained in the wash water along with the removed materials and carried away as waste. "Blow holes," in which explosive bursts of wash water open channels in the, filter media at the initiation of the backwashing cycle, must also be avoided. These blow holes allow influent to pass through the filter media without being filtered and allow finely-sized filter media to be carried away with the effluent, i.e., the filtered water.

Several underdrain designs have been developed over the years to address some of these potential problems. A common type of underdrain utilizes the multi-block, modular design in which approximately two- to four-foot long blocks, typically made of either ceramic, cement or plastic, are laid end to end and disposed next to each other in parallel rows, and then cemented or grouted in place to form the underdrain.

The interior of a typical block is divided into upper and lower chambers, i.e., horizontal passageways, separated by a horizontal partition or lateral, but interconnected by a plurality of orifices formed through the lateral. The multi-block, modular design is commonly employed in a filter having a central flume extending below the filter bottom, formed through the concrete supporting structure. The blocks that are vertically aligned with the flume have at least a portion of their bottom walls removed. Thus, the lower chambers are in fluid communication with the flume through orifices or cut-outs.

Modular underdrain designs inherently have joints to connect the blocks end-to-end. These joints may be prone to leakage, both external to the block, or internally, between the various chambers, thus inconsistently varying the hydraulic characteristics of the underdrain.

Most prior art joint designs also induce head loss across the joints, which further adversely affects the hydraulic characteristics of the underdrain. This head loss increases the pressure drop down the length of the underdrain and therefore requires a relatively larger chamber cross-sectional area to maintain favorable distribution characteristics. The larger chamber required for this type of underdrain results in a larger overall height and the height of the underdrain directly affects the required depth of the filter and associated costs. Thus, it is desirable to provide an underdrain system which does not have or need joints.

Prior art underdrains typically utilize porous filter media or caps which are situated on top of the underdrain system to serve as an additional filtering mechanism before the influent enters the underdrain. These caps, preferably porous plates, are usually screwed into place on the top of the underdrain or held in place with the use of gaskets. Either way, installation of the porous plates is rather difficult and inefficient, making it a time-consuming and costly procedure. Maintenance is thus overly burdensome as well, as over periods of use, the porous plates need to be removed and replaced. Prior art techniques also often result in imperfect seals between the underdrain and the porous plates. Thus, it is desirable to provide an underdrain system which provides for improved sealing, a more efficient manner of installation and reduced maintenance of porous filter media.

In addition, many prior art designs are very heavy structures, which makes shipment and installation difficult and costly. Thus, it is desirable to provide an underdrain system that comprises relatively light components, making it easier to transport, install, assemble, and maintain the system.

In general, prior art modular underdrains are very complex, typically consisting of many parts. This complexity, from which many drawbacks result, creates significantly high production costs as well as high costs of labor in installing and maintaining the many blocks of modular underdrain systems. As a primary object of the present, it is thus desirable to provide an underdrain that comprises less components and is relatively simple in its design, making it relatively inexpensive to manufacture, install and maintain.

SUMMARY OF THE INVENTION

An improved underdrain block for an underdrain system supporting a filter media bed in a liquid filtration system is provided. The underdrain blocks of the present invention are preferably made of an extrudable polymeric material that is extruded in relatively long sections to provide light weight, strong, easily manufactured underdrain systems having a lower profile than prior art underdrain blocks. Preferably, the underdrain blocks are made of polyvinyl chloride.

The underdrain block comprises an upper wall, side walls, a lower wall, at least one lateral member between the upper wall and the lower wall, at least two chambers within the underdrain block, each chamber being defined by the lateral member, a plurality of upper orifices in the upper wall of the underdrain block, and a plurality of internal orifices in the lateral member. In addition, the underdrain block is substantially greater in longitudinal length than a longitudinal distance between the upper orifices.

Preferably, the underdrain block comprises three lateral members within the underdrain block comprising two vertical lateral member and one horizontal lateral member. Preferably, the vertical lateral member divides the interior of the underdrain block into three sections of approximately equal size and the horizontal lateral member intersects the vertical lateral members such that the horizontal lateral member further divides the interior of the underdrain block into six chambers. Thus, in the preferred embodiment, there are three upper chambers of approximately equal size located above the horizontal lateral member and three lower chambers of approximately equal size located below the horizontal lateral member.

In one embodiment of an underdrain block according to the present invention, the underdrain block has rails situated on the upper wall for engaging extruded members. The extruded members have mating recesses for slidably engaging the rails of the underdrain block whereby the extruded members are slidably attached to the underdrain block. The extruded members also have receiving recesses for receiving a layer of porous filter media such as one or more porous plates. In another embodiment, the rails further comprise support rails on the upper wall of the underdrain for supporting a layer of filter media and the porous filter media.

In another embodiment of the present invention, the underdrain block further comprises side rails located on the side walls of the underdrain block. The side rails on one side wall are offset from the side rails on the other side wall of the underdrain block so as to align a plurality of underdrain blocks side-to-side, whereby the side rails of one underdrain block interlock with the side rails of an adjacent underdrain block.

In another embodiment of the present invention, the underdrain block further comprises an air nozzle for achieving an improved distribution of air through a filter bed during air backwashing. The air nozzle comprises a pipe having a closed end and an open end, the pipe having a vertical slot proximate the closed end and a hole proximate the open end. The air nozzle extends from the lower wall of the underdrain block to an area proximate the upper wall of said underdrain block, the closed end being located at the lower wall.

Methods for manufacturing the underdrain block according to the present invention are also provided. In addition, methods of filtering an influent through an underdrain system of the present invention as well backwashing a liquid filtration system and underdrain of the present invention are provided.

DETAILED DESCRIPTION OF THE PREFERRED EMBODIMENTS

The present invention provides improved low profile underdrain systems. These systems are used in conjunction with a filter bed system such that aqueous-based fluid is purified in the filter bed system and the filtrate is collected by the underdrain system. The underdrain systems of the present invention are preferably made of an extrudable polymeric material that is extruded in relatively long sections to provide light weight, strong, easily manufactured underdrain systems.

The low profile underdrain system of the present invention comprises relatively long underdrain blocks. The low profile underdrain blocks comprise blocks of approximately 10, preferably 15, more preferably 20, and even more preferably 25 feet long as opposed to prior art underdrain blocks of approximately 2 to 4 feet long. Underdrain blocks longer than 25 feet are also possible.

The blocks of the present invention can be constructed of an extrudable material, preferably an extrudable polymeric material. The ability to extrude the polymeric material is advantageous to produce relatively long underdrain sections in an economical fashion. Preferred extrudable polymeric materials include polyvinyl chloride (PVC), chlorinated polyvinyl chloride (CPVC), high density polyethylene (HDPE), and other thermoplastic materials. Alternatively, aluminum or steel may be used to extrude the underdrain blocks. PVC, however, is the preferred material because of its light weight, strength, chemical resistance, cost, and general acceptance in the water and waste water industries.

The physical characteristics of the extrudable polymeric material are chosen such that the material can be readily extruded to the desired shape of the underdrain system. Thus, the underdrain system is constructed of materials different than those used previously, which are more suitable for different manufacturing methods, such as short ceramic extrusion and injection molding.

The manufacturing process used to extrude the underdrain system is typically accomplished by heating the material to its melting point, directing it through a die to form the desired cross section, and maintaining the desired shape until the part has cooled enough to become dimensionally stable. Due to the intricacies of certain underdrain designs, care must be taken to control the various process parameters-material temperature, material flow rate, production rate, exit temperature, cooling air flow, etc.—to properly cool the extruded form to maintain its structural integrity.

Properly directing the extrusion material to different areas of the extrusion die to form the desired part are functions of the material properties, the speed at which the part is extruded and the design of the part (and thus the die). Parts that have internal webs or other features that are not accessible from the exterior of the part pose a difficult problem because the cooling of the internal features cannot be easily controlled. Inadequate cooling can cause distortion of webs or other features, which is detrimental to the structure and aesthetics of the part.

Cooling of the part as it comes out of the die can be accomplished by the use of various combinations of vacuum calibrators and cooling baths. Vacuum calibrators are devices that maintain the cross section of the part by drawing a vacuum on the part and thereby pulling it against a tool that defines the desired shape. Cooling baths circulate a cooling fluid around the part to transfer heat away from the part.

The extrusion process for the present invention requires careful design of the particular underdrain cross section, the die and associated parts due to the size, weight, and complexity of the part. An underdrain cross section according to the present invention can typically weigh approximately 6 pounds per foot of extrusion when using PVC. For such underdrain designs, multiple combinations of vacuum calibrators and cooling, baths can be used in conjunction with careful attention to extrusion rates and quality control procedures to ensure a high quality part with acceptable tolerances.

It has been found that not all cross section designs for underdrains can be extruded to yield a suitable part. For example, the cross section of a commonly-used underdrain block that is disclosed in U.S. Pat. No. 3,110,667, cannot be extruded to the lengths achieved with the present invention because of the weight of the material used and the internal wall thickness.

Figure 1:
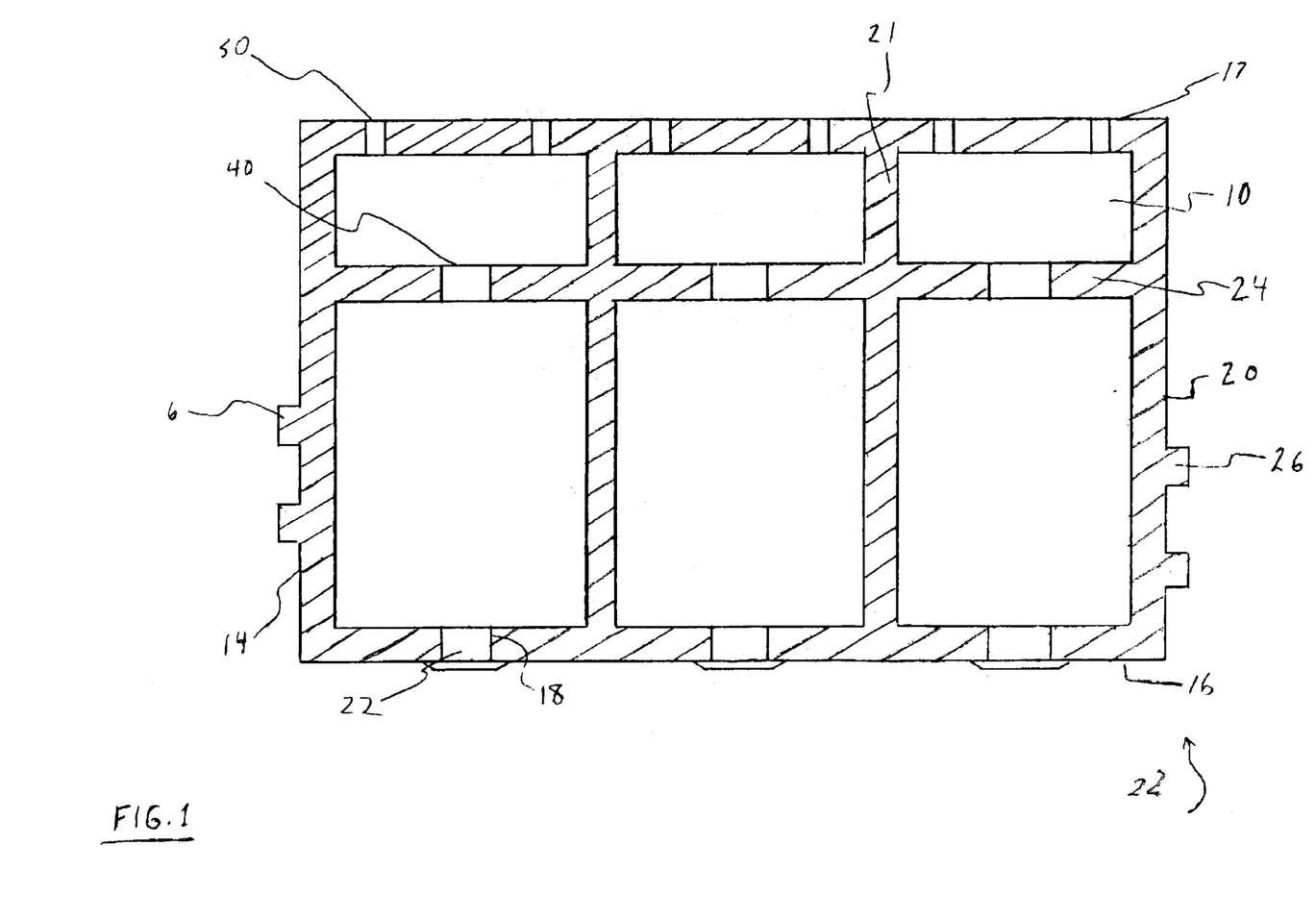
FIG. 1 is a cross-sectional view of a preferred embodiment of the low profile underdrain according to the present invention.

An underdrain design that can be formed in accordance with the extrusion process of the present invention resulting in a relatively long block of uniform cross section is shown in FIG. 1, which depicts a cross-sectional view of the preferred embodiment of the low profile extruded underdrain. The cross section of the underdrain block 60 has an overall shape of a rectangle. The underdrain block 60 has an upper wall 12, side walls 14, and a lower wall 16. Lateral members or laterals 24 define three upper chambers 10 located above three lower chambers 20, each having the shape of a rectangle.

Upper orifices 30 provide passages for water to gain access to the upper chambers 10 of the underdrain system during filtration or for water or air to enter the filter bed from the underdrain 60 during backwashing. Internal orifices 40 provide passages for the water to gain access to the lower chambers 20 from the upper chambers 10 during filtration or for water or air to gain access to proceed to upper chambers 10 from the lower chambers 20 during backwashing.

The underdrain block 60 is also equipped with side rails 26 located on the side walls 14 of the underdrain block 60. The side rails 26 help to align the underdrain blocks 60 side-to-side in the filter basin. As the side rails 26 on one side wall 14 are offset from the side rails 26 on the other side wall 14 of the underdrain block 60 so that the rails 26 matably align. The side rails 26 provide greater stability of the underdrain blocks 60 than that obtained by only grouting them in place.

On an alternate embodiment, the side rails 26 on one underdrain block 60 will interlock with the side rails 26 of an adjacent underdrain block 60. This embodiment will eliminate the requirement for grout between adjacent blocks 60.

After extrusion, the long blocks 60 will have no orifices, i.e., neither upper orifices 30 nor internal orifices 40. Preferably, the upper orifices 30 are provided by drilling holes through the upper wall 12 of the underdrain block 60 at the desired pitch, i.e., distance from each other along the length of the underdrain block 60. Preferably, the internal orifices 40 are provided by drilling through the lower wall 16 of the underdrain block 60. Alternatively, the internal orifices 40 can be provided by drilling through existing upper orifices 30 if the desired locations of each should vertically line up.

When the internal orifices 40 are obtained by drilling through the lower wall 16 of the underdrain block 60, undesired holes 18 will sometimes result on the lower wall. 16. These undesired holes 18 can be plugged with a plug or grommet 22 so as not to allow any water or air to pass. Cut-outs will also be provided by drilling or cutting in the lower wall 16 of the underdrain block 60 so as to provide a passageway between the lower chambers 20 and a flume.

Figure 2:
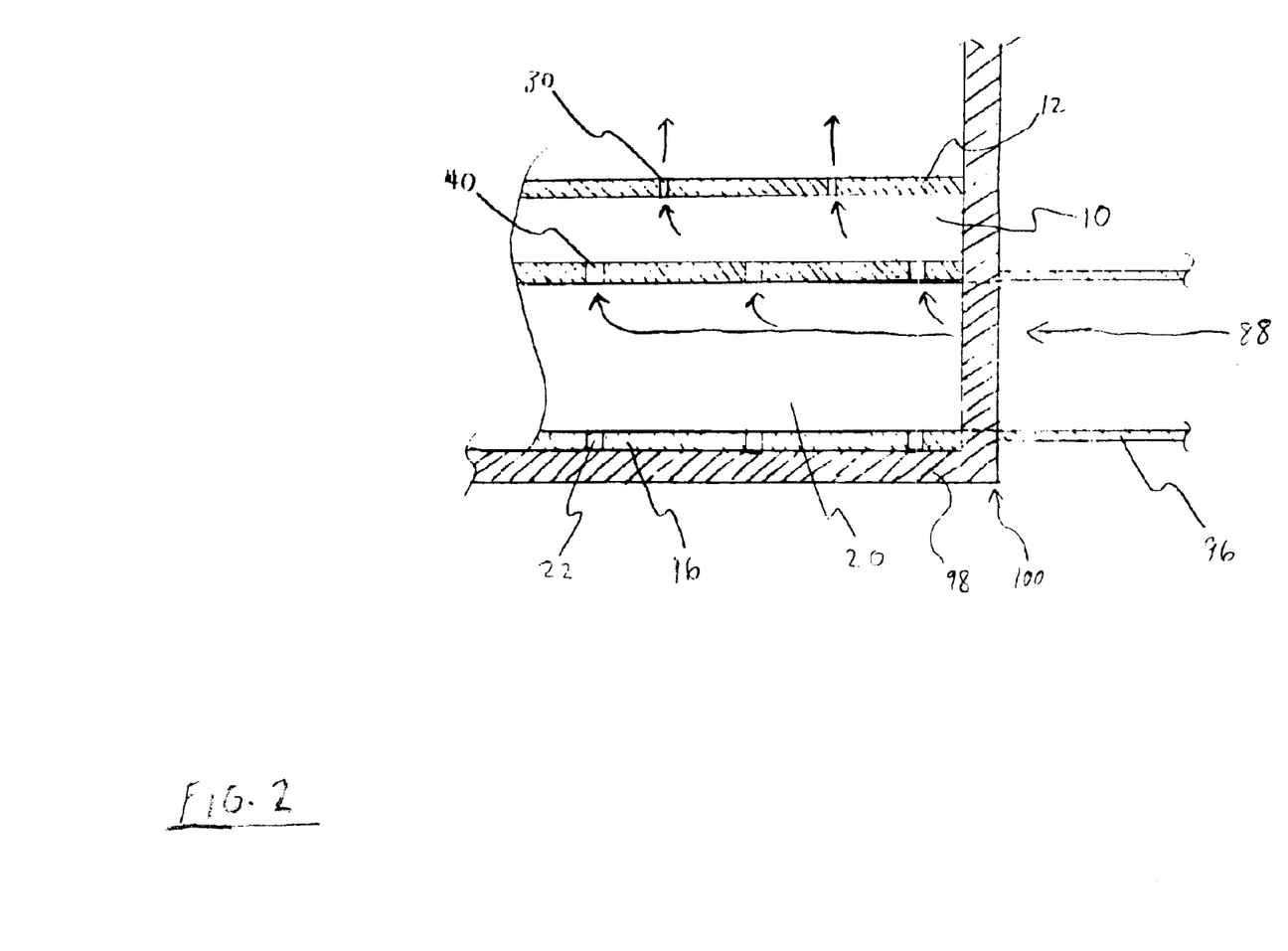
FIG. 2 is a side view of a wall sleeve in cooperation with an underdrain block according to the present invention.

A flume provides a conduit for the effluent to flow out of the filter basin during filtration and for pressurized water or air to flow through the flume in a reverse direction during backwashing. Alternatively, wall sleeves, which are connected in fluid communication with the end of an underdrain block 60, e.g., connected to the open end of the lower chambers 20 of an underdrain block, can be used to serve the same function as that of the flume. FIG. 2 depicts a side view of a wall sleeve 96 in cooperation with an underdrain block 60, as the block 60 lies on the floor 98 of a filter basin 100. FIG. 2 illustrates the path of the pressurized water and/or air 88 during backwashing when a wall sleeve 96 is used.

End plates are also needed with the present invention to seal the ends of each chamber 10 and 20 to prevent water or air from bypassing the orifices 30 and 40. End plates are shaped to fit the end of an underdrain block 60, i.e., the cross section. Preferably, end plates are vacuum molded out of PVC and glued in place with PVC cement.

Figure 3:
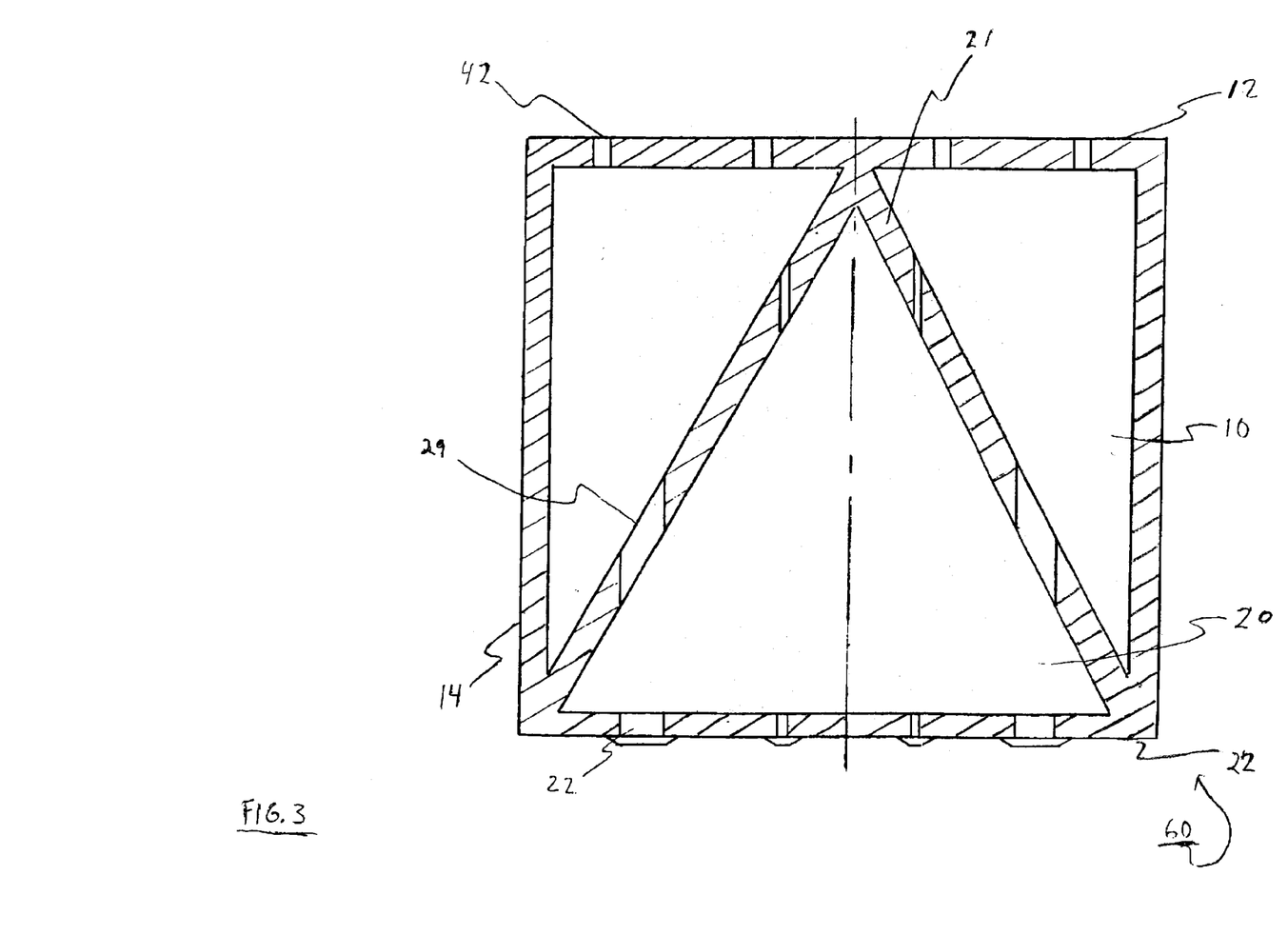
FIG. 3 is a cross-sectional view of an alternate preferred embodiment of the low profile underdrain according to the present invention.

It should be noted that although certain cross sections cannot be extruded with current extrusion technology, there are many cross-sectional designs that can be made in accordance with the present invention. For example, FIG. 3 shows an alternate preferred embodiment of the low profile underdrain according to the present invention. As shown in FIG. 3, the lateral members 24. within the underdrain block 60 define two upper chambers 10 and one lower chamber 20, all of triangular shape.

The upper orifices 30 are spaced at a predetermined pitch along the length of the underdrain block 60. The size and spacing of the upper orifices 30 are dependent on practical issues regarding hydraulic considerations, structural capacity, and manufacturing concerns as well as on the size and type of filter media placed on top of the underdrain.

Hydraulically, the size and number of the upper orifices 30 must be such that the combined area of the orifices provides adequate head loss at the design flow rate in order to provide the desired flow distribution. Limitations on head loss are the cost and practicality of pumping the backwash fluid at a high pressure.

The spacing of the upper orifices 30 must be close enough to provide good flow distribution through the filter media. These constraints also limit how close the upper orifices 30 may be to each other. It should also be noted that these constraints also limit the size and spacing of the internal orifices 40. Additional limitations are required clearances between drills and proper operation of the drill fixture used to create the orifices 30 and 40. The location of various orifices of a typical underdrain is well within the knowledge of those of ordinary skill in the art and varies for different end uses and applications.

If a support gravel is used on the top of the underdrain, the size of the upper orifices 30 must be large enough to preclude media becoming trapped in the upper orifices 30 and preventing flow. If porous filter media such as porous plates are placed on the upper wall 12 of the underdrain, the orifice size does not have this limitation. Preferably, the underdrain blocks 60 are manufactured at a length substantially greater than the pitch for each underdrain block 60.

Figure 4:
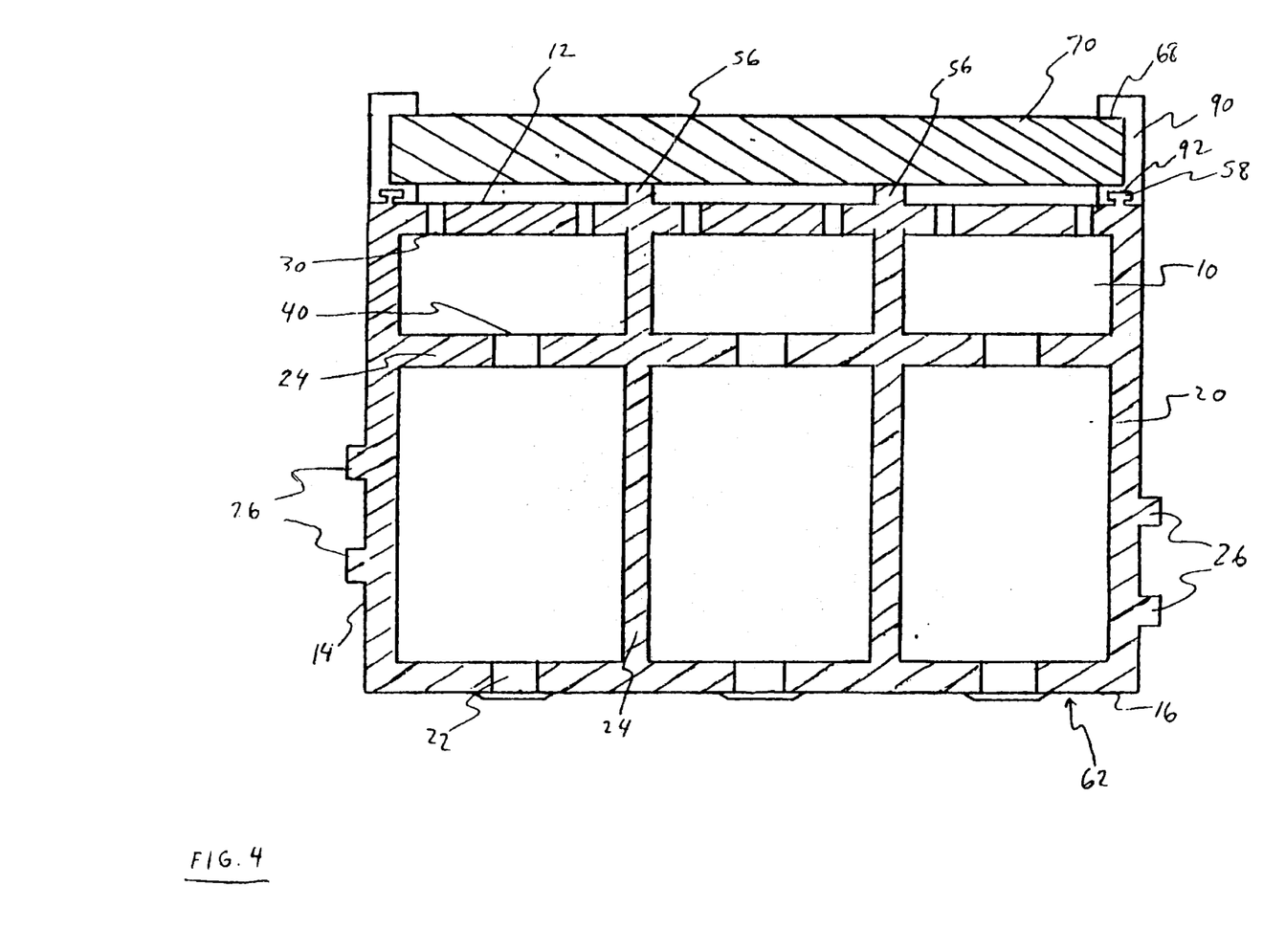
FIG. 4 is a cross-sectional view of a preferred embodiment of the low profile underdrain according to the present invention in cooperation with porous filter media.
Figure 4A:
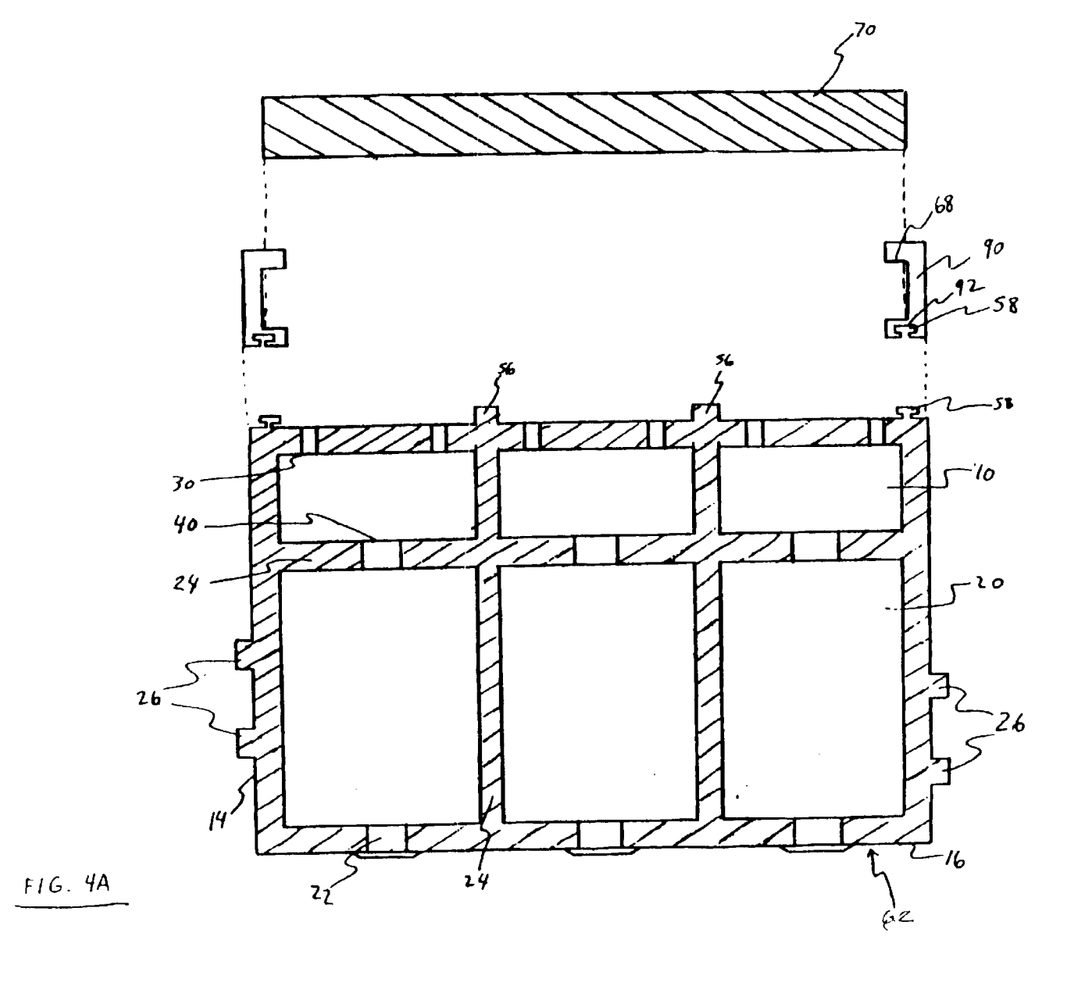
FIG. 4A is an exploded, cross-sectional view of the components of FIG. 4.
Figure 4B:
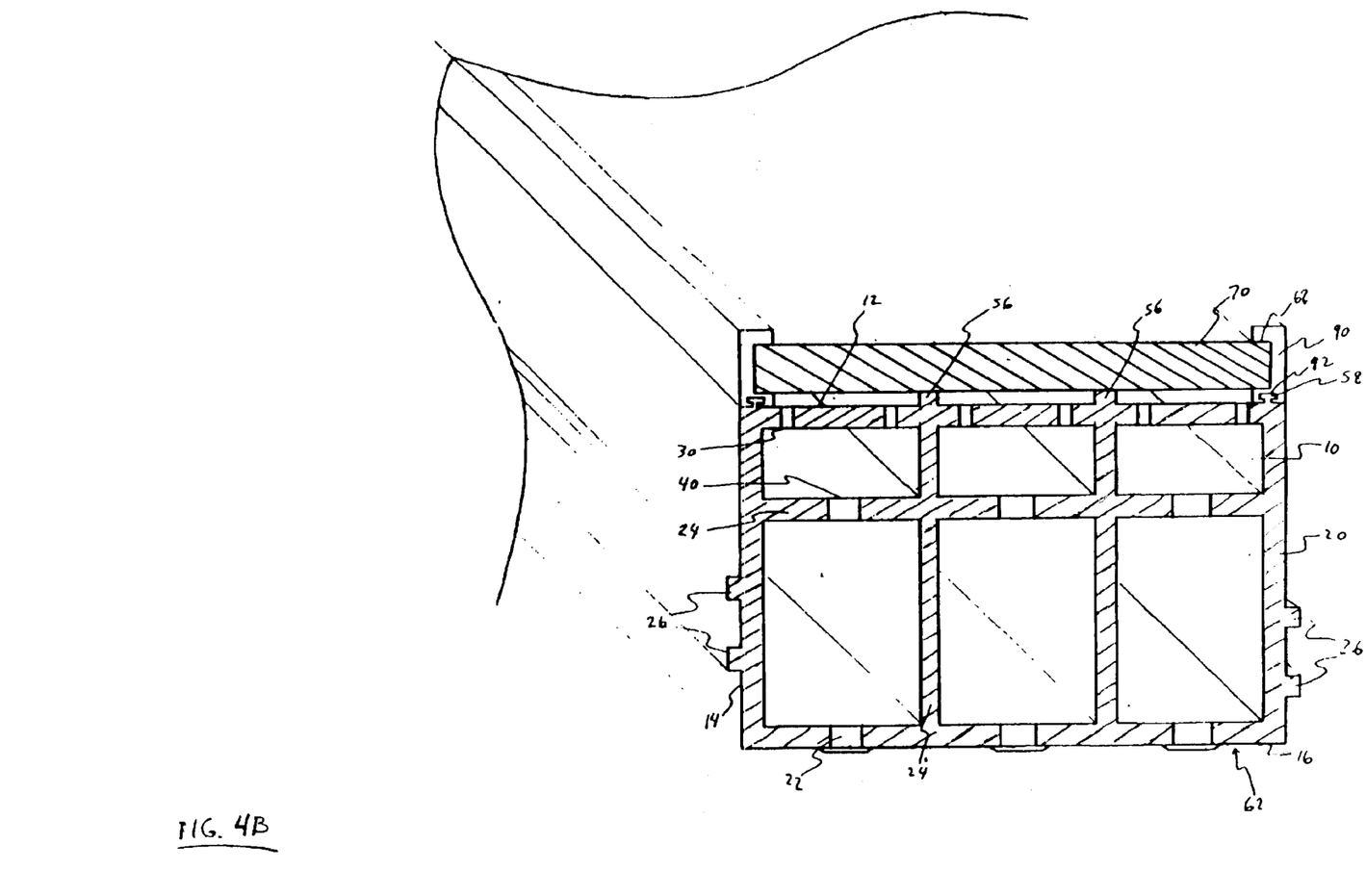
FIG. 4B is a perspective view of the low profile underdrain of FIG. 4.

Another feature of the present invention is that of extrusion rails. FIG. 4 shows the cross-sectional view of a preferred embodiment of the underdrain block 60 which is equipped to accommodate porous filter media such as porous plates 70. FIG. 4A shows an exploded, cross-sectional view of the components of FIG. 4. FIG. 4B shows a perspective view of the underdrain block of FIG. 4, illustrating that each component has a length. In this embodiment, the underdrain block 60 has rails 58, shown here as "T"-shaped rails, on the sides of the upper wall 12 of the block 60 substantially above the side walls 14 and has support rails 56 on the upper-wall 12 of the block 60 directly above the vertical laterals 24 of the underdrain block 60.

Prior to installation of the underdrain blocks 60 in a filter basin, extruded members 90, called F-extrusions 90 are matably joined to the underdrain block 60 by sliding the F-extrusions 90 over the T-shaped rails 56. Alternatively, F-extrusions 90 may be glued in place. Mating recesses 92 of the F-extrusions 90 interlock with the T-shaped rails 58 of the underdrain block 60 resulting in a secure fit.

Porous plates 70 are then slid into place in plate-receiving recesses 68 on the F-extrusions 90 that are shaped to securely accommodate the porous plates 70. Additional support for the porous plates 70 and filter media situated on top of the porous plates 70 is also provided by support rails 56. The underdrain blocks 60 with porous plates 70 in place are then installed in the filter basin. Preferably, the F-extrusions 90 are extruded with the same material as that of the underdrain blocks 60. In this way, the rails 58 provide a means to secure the F-extrusions 90 in place such that there is a means to secure, removably, the porous plates 70 to the liquid filtration system.

For illustrative purposes, preferably, the overall height of the underdrain block 60 is approximately 4–8 inches, where the height of the upper chambers 10 is approximately 1–2 inches and the height of the lower chambers 20 is approximately 3–5 inches. Preferably, the overall width of the underdrain block 60 is approximately 10–13 inches, where the width of each chamber 10 and 20 is approximately 3–4 inches. Preferably, the height of the F-extrusions 90 is approximately 1–2 inches, while the thickness of each porous plate 70 is approximately 1 inch. Preferably, the diameter of each upper orifice 30 is approximately 0.25 inch, while the diameter of each internal orifice 40 is approximately 0.5 inch. The size of these various members of the underdrain system is, as is known in the art, dependent on design flow rate, design head loss and desired distribution characteristics. It should also be noted that the size and number of orifices 30 and 40 and chamber 10 and 20 dimensions are interrelated with the above design charateristics.

Figure 5:
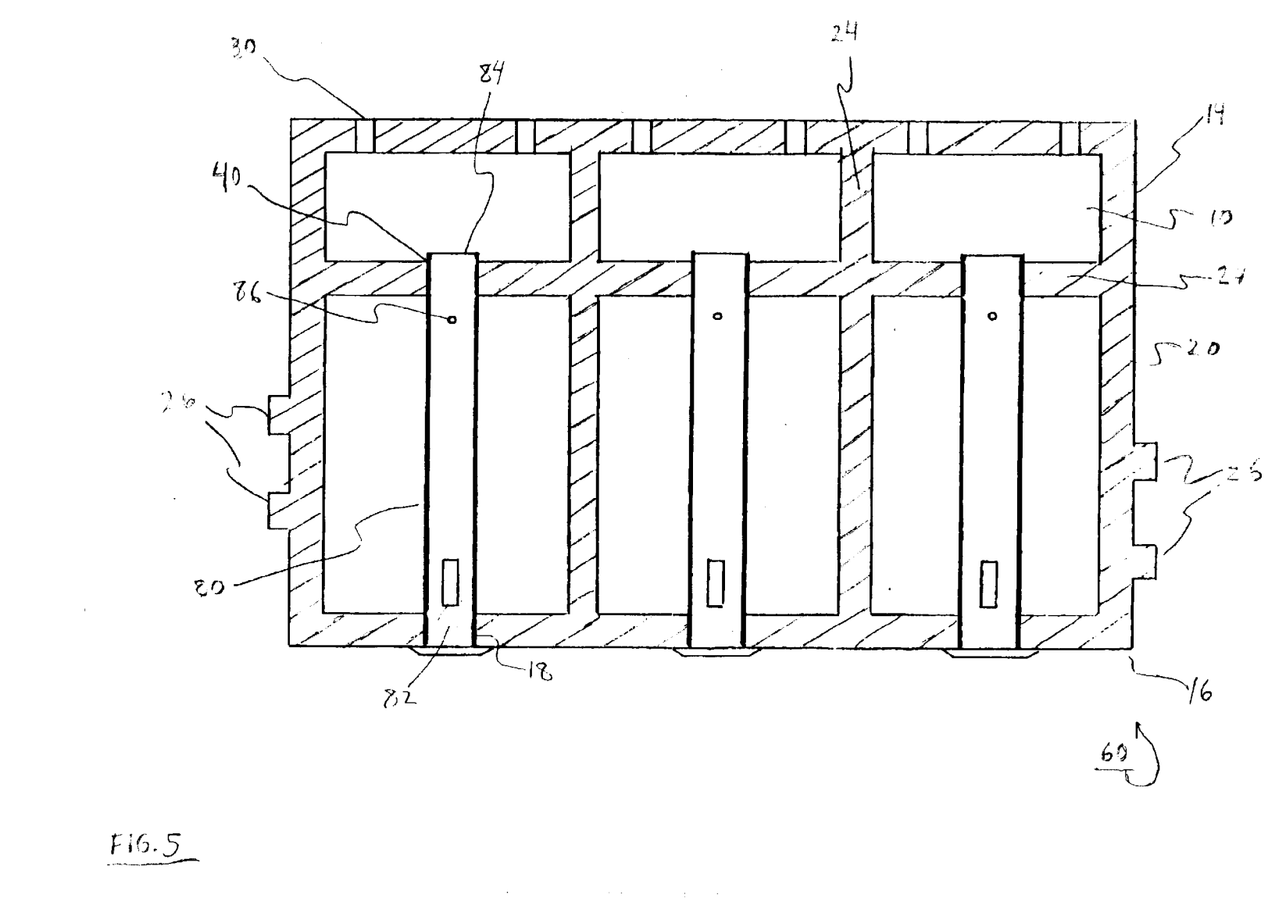
FIG. 5 is a cross-sectional view of three air nozzles according to the present invention in cooperation with a preferred embodiment of the underdrain block according to the present invention.

Another feature of the present invention is the incorporation of an air nozzle or air pipe 80. FIG. 5 shows the cross-sectional view of three air nozzles 80 in cooperation with the underdrain block 60 of the present invention. The purpose of the air nozzle 80 is to achieve a more even distribution of air through the filter bed during air backwashing than without the air nozzle 80.

In the preferred embodiment, multiple air nozzles 80 are placed through the holes 18 in the lower wall 16 of the underdrain block 60, replacing the plugs 22, through the lower chamber 20 and into the upper chamber 10. In the preferred embodiment, the air nozzle 80 has a vertical slot 82 (a lower opening or primary orifice) in the lower portion of the air nozzle 80, situated in the lower chamber 20, and an opening 84 at the opposite end of the air nozzle 80, situated in the upper chamber 10. A small hole 86 (an upper opening or metering orifice) is also provided in the upper portion of the air nozzle 80, situated in the lower chamber 20, just below the horizontal lateral 24.

In a typical backwashing procedure, before an air scour is initiated, all of the chambers 10 and 20 of the underdrain are full of water. This water must be displaced in order to allow air to enter the lower chambers 20, pass into the upper chambers 10 through the internal orifices 40, and exit out of the upper orifices 30. The natural behavior of the air is to minimally displace the water and take the path of least resistance, which is typically in the region nearest the air entrance because the remaining water impedes the air flowdown the length of the underdrain. This behavior results in grossly uneven distribution of air. By installing air nozzles 80 at discrete intervals and carefully sizing and locating openings 82 and 86 in the air nozzles 80, a means is provided that allows the air to displace the water down the length of the underdrain before air can enter through the air nozzle 80.

As air enters the lower chamber 20, water is displaced by the air and the water level in the lower chamber 20 drops until the upper opening or upper metering orifice 86 is exposed. At this point, air can enter the air nozzle 80, pass into the upper chamber 10, and exit out of the upper orifices 30. As air flow increases, the pressure drop across the upper metering orifice 86 increases, causing the water level in the lower chamber 20 to drop further until the lower opening or primary orifice 82 is exposed.

At this point, virtually the entire lower chamber 20 is evacuated of water and the air enters the air nozzles 80 through both the metering and primary orifices 86 and 82. This design allows the air to evenly displace the water in the underdrain and gradually and evenly introduce air into the filter media above. This design also allows for a water-only mode in which water enters the air nozzle through the primary and metering orifices. 86 and 82.

As shown in the preferred embodiment in FIG. 5, an air nozzle 80 can be placed in each of the three sections of the underdrain block 60, i.e., the middle and both side sections, to ensure the most even distribution of air into the upper chamber 10 and thus, up into the filter bed. Alternatively, only one air nozzle can be used. In this alternative embodiment, the air nozzle 80 is located only in the middle section and the air is distributed into the filter bed from the middle section only. This embodiment is less expensive because it only uses one air nozzle as opposed to three. This embodiment also allows for a higher water flow rate through the chambers that do not have air nozzles, but provides a less dense pattern of air distribution.

One benefit from the extruded underdrain of the present invention is that it provides an underdrain that has a low profile, i.e., it has considerably less height than prior art underdrains. The underdrain of the present invention is approximately 4 to 5 inches lower in height than prior art two-tier underdrains. This feature helps reduce the required height of the filter basin and associated costs.

This lower height is a result of a combination of factors. First, head loss is reduced with the extruded design because without joints, associated leakage from joints is eliminated. Thus, the pressure loss of water flowing down the length of the underdrain is primarily only lost to friction. Second, because of the internal orifices 40 between the lower chambers 20 and the upper chambers 10, the velocity of water flowing through the lower chamber 20 decreases along the length of the underdrain.

The pressure recovery due to the decrease in kinetic energy caused by the reduction in velocity is greater than the pressure loss due to friction down the length of the underdrain. This behavior allows the cross-sectional area of the lower chamber 20 to be reduced compared to prior art underdrains in which the pressure loss due to friction and joints between underdrain blocks exceeds the pressure recovery due to the reduction in velocity. With extruded underdrains, the reduction in pressure loss due to friction and the absence of joints and often yields vastly different distribution characteristics in comparison to prior art cross-sectional underdrain designs.

The flow rate through an orifice is proportional to the square of the pressure of the water or air upstream of the orifice. The pressure distribution, and therefore, flow distribution, in both the upper 10 and lower chambers 20 can be affected by installing baffles in selected areas of the lower chambers 20 or by placing additional internal orifices 43 in the horizontal laterals 24 between the upper 10 and lower chambers 20. Baffles may be in the form of various-shaped plates 91 or pipes 93 and may be oriented at angles, perpendicular to the flow, in the direction of the flow, or against the flow, dependent on the degree of pressure regulation desired.

Figure 6A:
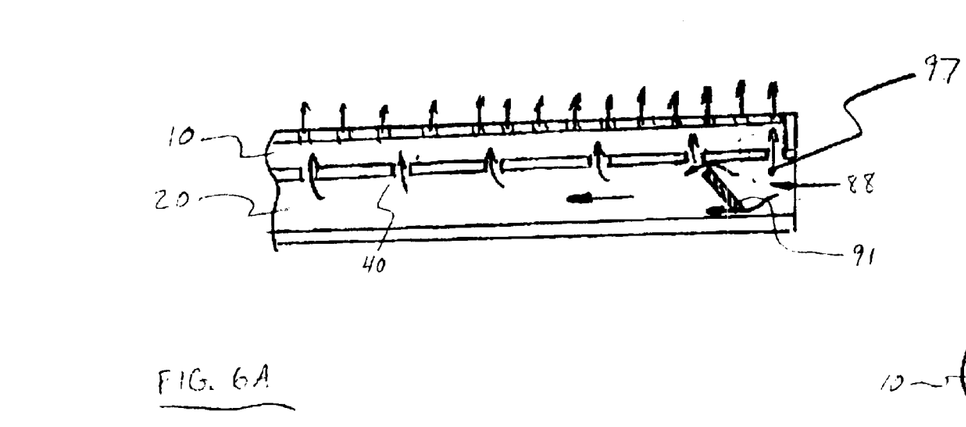
FIG. 6A is a cross-sectional, elevation view of the underdrain block according to the present invention, depicting a plate baffle and a resulting flow pattern.
Figure 6B:
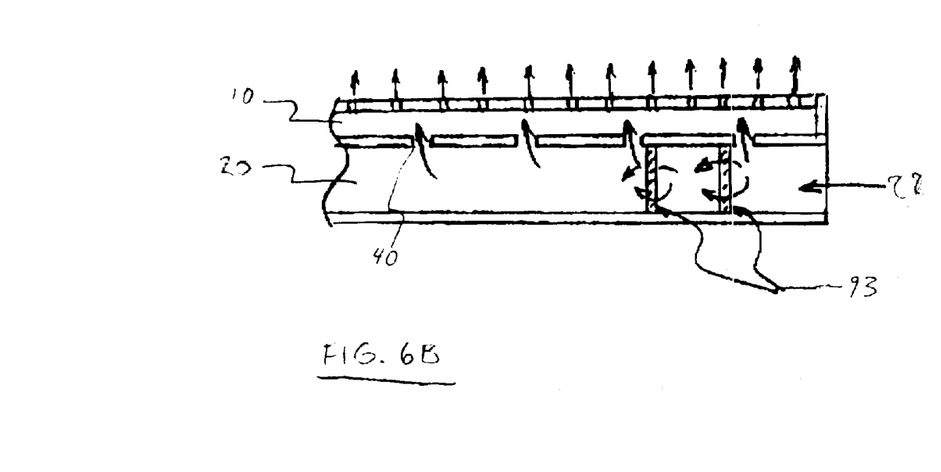
FIG. 6B is a cross-sectional, elevation view of the underdrain block according to the present invention, depicting multiple tubular baffles and a resulting flow pattern.

FIG. 6A shows a cross-sectional, elevation view of an underdrain block 60 according to the present invention, depicting an angled plate baffle 91 and a resulting flow 88 pattern. FIG. 6B is a cross-sectional, elevation view of the underdrain block 60 according to the present invention, depicting multiple tubular baffles 93 (pipes) and a resulting flow 88 pattern. Referring to FIG. 6A, the baffle 91 causes a pressure drop which effectively increases the relative pressure within the local area 97 of the lower chamber 20 proximate the baffle. This local pressure increase also increases the pressure and flow in the area of the upper chamber 10 directly above the baffle.

Figure 7:
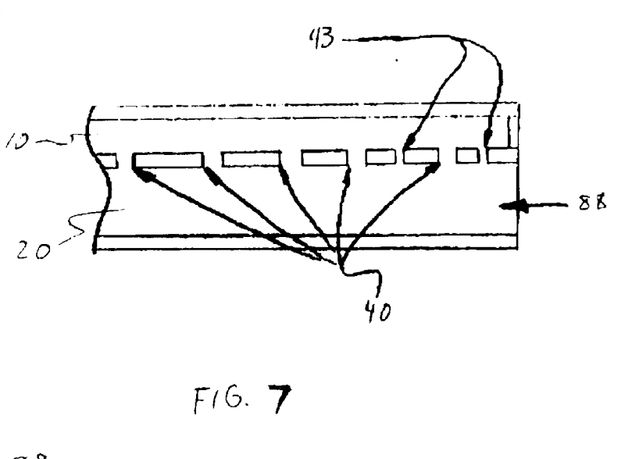
FIG. 7 is a cross-sectional, elevation view of the underdrain block according to the present invention, depicting additional internal orifices.

Similarly, the additional internal orifices 43 in the horizontal laterals 24 separating the chambers 10 and 20 allow additional flow into the upper chamber 10, i.e., during backwashing. FIG. 7 is a cross-sectional, elevation view of the underdrain block 60 according to the present invention, depicting additional internal orifices 43.

When located in the length of the underdrain in areas of low flow, the baffles 91 and 93 and/or additional internal orifices 43 provide for correction of poor flow distribution. When located in strategic areas of an underdrain, such as in the area of a flume or wall sleeve, these features help the extruded underdrain achieve better distribution than has previously been achieved with prior art underdrains.

The extrusion rails feature of the present invention provides an underdrain system which utilizes a porous filter media system which does not require the use of screws or gaskets. As a result, installation of porous plates 70 on the extruded underdrain is considerably easier than prior art porous filter media systems, while sealing of the porous plates 70 is also improved. Thus, the present invention provides an underdrain system which, provides for a more efficient manner of installation and reduced maintenance of porous filter media.

By extruding one relatively long underdrain block 60, the resulting underdrain system comprises less components than the prior art systems. By using materials such as an extrudable polymeric plastic, the resulting underdrain system is lighter than prior art systems. Prior art underdrain blocks made of ceramic are also much more susceptible to damage such as chipping, and their weight contributes to this drawback. Fewer components and lighter components make the present invention easier to ship, install, assemble and maintain.

By extruding one relatively long underdrain block 60, the resulting underdrain system is considerably less complex than the prior art systems. For example, no joints are necessary to connect the longer blocks 60, end-to-end or side-to-side. This design significantly reduces production costs with respect to manufacturing and installation. Maintenance costs are also reduced because there are less components that can malfunction.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A filter system comprising a filter media and underdrain block for an underdrain system supporting the filter media in a liquid filtration system, the underdrain block comprising:
   an upper wall, side walls, and a lower wall;
   at least one lateral member with the underdrain block between the upper wall and he lower wall;
   at least two chambers within the underdrain block, each chamber being defined by the lateral member;
   a plurality of orifices in the upper wall of the underdrain block; and
   a plurality of internal orifices in the lateral member;
   wherein the underdrain block is jointless, extends substantially the length of the filter media supported thereby and has a longitudinal length of at least 10 feet.

2. A filter system comprising a filter media and underdrain block for an underdrain system supporting the filter media in a liquid filtration system, the underdrain block comprising:
   an upper wall, side walls, and a lower wall;
   at least one lateral member with the underdrain block between the upper wall and he lower wall;
   at least two chambers within the underdrain block, each chamber being defined by the lateral members;
   a plurality of orifices in the upper wall of the underdrain block; and
   a plurality of internal orifices in the lateral member;
   wherein the underdrain block is jointless, extends substantially the length of the filter media supported thereby and has a longitudinal length of at least 20 feet.

3. An underdrain block for an underdrain system supporting a filter media bed in a liquid filtration system, the underdrain block comprising:
   an upper wall, side walls, and a lower wall, said walls defining an interior of said underdrain block;
   three lateral members within the underdrain block comprising two vertical lateral members and one horizontal lateral member, said two vertical lateral members dividing said interior of the underdrain block into three sections of approximately equal size, said horizontal lateral member intersecting said two vertical lateral members such that said horizontal lateral member further divides the interior of the underdrain block into six chambers comprising three upper chambers of approximately equal size located above said horizontal lateral member and three lower chambers of approximately equal size located below said horizontal lateral member;
   a plurality of upper orifices through the upper wall of the underdrain block; and
   a plurality of internal orifices through the horizontal lateral member.

4. The underdrain block of claim 3 further comprising:
   a plurality of air nozzles located in each section of the underdrain and each located at different lengths along the length of the underdrain, each air nozzle comprising:
      a pipe having a closed end and an open end, said pipe extending from the lower wall of said underdrain through the internal orifice into the upper chamber, said pipe having a vertical slot proximate the closed end and situated in the lower chamber substantially near the lower wall, said pipe further having a hole situated in the lower chamber substantially near the horizontal lateral member, said open end situated in the upper chamber substantially near the horizontal lateral member.

5. A filter system comprising a filter media and underdrain block for an underdrain system supporting the filter media bed in a liquid filtration system, the underdrain block adapter for distributing washing fluid comprising:
   a plurality of walls integrally connected; and
   at least one chamber within the underdrain block being defined by the walls;
   wherein the underdrain block is jointless and has a longitudinal length of at least five feet which extends substance the length of the filter media.

* * * * *

UNITED STATES PATENT AND TRADEMARK OFFICE
CERTIFICATE OF CORRECTION

PATENT NO. : 6,740,237 B1  Page 1 of 1
APPLICATION NO. : 08/935365
DATED : May 25, 2004
INVENTOR(S) : Roberts et al.

It is certified that error appears in the above-identified patent and that said Letters Patent is hereby corrected as shown below:

Claim 1, line 5, "with" should be -- within --;

Claim 1, line 6, "he" should be -- the --;

Claim 2, line 5, "with" should be -- within --;

Claim 2, line 6, "he" should be -- the --;

Claim 2, line 8, "members" should be -- member --;

Claim 5, line 3, "adapter" should read -- adapted --; and,

Claim 5, line 10, "substance" should read -- substantially --.

Signed and Sealed this

Twenty-second Day of May, 2007

JON W. DUDAS
*Director of the United States Patent and Trademark Office*